United States Patent
Lee et al.

(10) Patent No.: US 9,777,804 B2
(45) Date of Patent: Oct. 3, 2017

(54) PLANETARY GEAR TRAIN OF AUTOMATIC TRANSMISSION FOR VEHICLE

(71) Applicant: Hyundai Motor Company, Seoul (KR)

(72) Inventors: Kyeong Hun Lee, Seoul (KR); Jong Soo Kim, Seoul (KR); Jong Sool Park, Hwaseong-si (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/267,439

(22) Filed: Sep. 16, 2016

(65) Prior Publication Data

US 2017/0219057 A1  Aug. 3, 2017

(30) Foreign Application Priority Data

Feb. 3, 2016 (KR) ........................ 10-2016-0013647

(51) Int. Cl.
*F16H 3/66* (2006.01)
*F16H 37/04* (2006.01)
*F16H 3/44* (2006.01)

(52) U.S. Cl.
CPC ............. *F16H 3/66* (2013.01); *F16H 37/04* (2013.01); *F16H 2003/445* (2013.01); *F16H 2200/0065* (2013.01); *F16H 2200/2012* (2013.01); *F16H 2200/2046* (2013.01)

(58) Field of Classification Search
CPC ........................................................ F16H 3/66
See application file for complete search history.

(56) References Cited

U.S. PATENT DOCUMENTS

| 2015/0148180 A1* | 5/2015 | Otake | F16H 3/66 475/276 |
| 2016/0084353 A1* | 3/2016 | Beck | F16H 3/66 475/278 |
| 2016/0230849 A1* | 8/2016 | Haupt | F16H 3/66 |

FOREIGN PATENT DOCUMENTS

KR  10-2011-0131817 A  12/2011

* cited by examiner

*Primary Examiner* — Derek D Knight
(74) *Attorney, Agent, or Firm* — Morgan, Lewis & Bockius LLP (57) ABSTRACT

A planetary gear train of an automatic transmission for a vehicle including a first planetary gear set, a second planetary gear set, a third planetary gear set, a fourth planetary gear set, an input shaft mounted with the first, second, and third planetary gear sets at an external circumference of the input shaft, an output shaft mounted with the fourth planetary gear set on an external circumference of the output shaft, a first shaft, a second shaft, a third shaft, a fourth shaft, a fifth shaft, a sixth shaft, a seventh shaft gear-meshed with one shaft among the fifth and sixth shafts, an eighth shaft directly connected with the output shaft, a ninth shaft gear-meshed with a remaining shaft among the fifth and sixth shafts that is not gear-meshed with the seventh shaft, and transfer gears.

17 Claims, 4 Drawing Sheets

| Shift-stage | Control element | | | | | | Gear ratio | Step ratio | Remark |
|---|---|---|---|---|---|---|---|---|---|
| | C1 | C2 | C3 | B1 | B2 | B3 | | | |
| D1 | | | ● | | ● | ● | 5.558 | - | Gear ratio span : 11.03 |
| D2 | | | ● | ● | | ● | 3.304 | 1.68 | |
| D3 | ● | | ● | | | ● | 2.174 | 1.52 | |
| D4 | | ● | ● | | | ● | 1.546 | 1.41 | |
| D5 | ● | ● | ● | | | | 1.074 | 1.44 | |
| D6 | | ● | ● | ● | | | 0.845 | 1.26 | |
| D7 | | ● | ● | | ● | | 0.737 | 1.16 | |
| D8 | | ● | | ● | ● | | 0.613 | 1.20 | |
| D9 | ● | ● | | | ● | | 0.504 | 1.22 | Ratio of REV vs D1 : 0.78 |
| REV | ● | | | | ● | ● | 4.339 | - | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2016-0013647, filed Feb. 3, 2016, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering stiff competition in enhancing fuel consumption of a vehicle.

In this sense, research on an automatic transmission has been performed to simultaneously provide better drivability and fuel consumption by achieving more shift stages.

However, in order to achieve more shift stages for an automatic transmission, the number of parts is typically increased, which may deteriorate installability and/or power flow efficiency and may increase production cost, and weight.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements has been attempted. However, such an arrangement is not widely applicable, and using dog clutches may easily deteriorate shift-feel.

In addition, a recent eight-speed automatic transmission typically shows a gear ratio span in a level of 6.5 to 7.5, which requires improvement for better fuel efficiency.

Thus, shortening a length of an automatic transmission without deteriorating performance will be beneficial.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of realizing at least nine forward speeds and at least one reverse speed by a combination of four planetary gear sets, two external gears and six control elements, thereby providing improvement of power delivery performance and fuel consumption and improving installability by reducing a length.

In addition, a wide available range of varying gear teeth of transfer gears enables easily obtaining optimum gear ratios for respective vehicles, thereby improving power delivery performance and fuel consumption.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, an input shaft mounted with the first, second, and third planetary gear sets at an external circumference of the input shaft, an output shaft disposed in parallel with the input shaft and mounted with the fourth planetary gear set on an external circumference of the output shaft, a first shaft connected with the first rotation element, a second shaft connecting the second rotation element, the fifth rotation element, and the ninth rotation element, a third shaft interconnecting the third rotation element and the fourth rotation element, a fourth shaft connected with the sixth rotation element, a fifth shaft connected with the seventh rotation element, a sixth shaft connected with the eighth rotation element, a seventh shaft connected with the tenth rotation element, and gear-meshed with one shaft among the fifth and sixth shafts, an eighth shaft connected with the eleventh rotation element and directly connected with the output shaft, a ninth shaft connected with the twelfth rotation element, and gear-meshed with a remaining shaft among the fifth and sixth shafts that is not gear-meshed with the seventh shaft, and transfer gears, each gear-meshed with at least one of the first, second, third, fourth, fifth, sixth, seventh, eighth, and ninth shafts.

The first shaft may be selectively connectable with at least one of the input shaft and a transmission housing, the third shaft may be selectively connectable with the input shaft, the fourth shaft may be selectively connectable with the transmission housing, and the sixth shaft may be selectively connectable with the input shaft.

The first planetary gear set may include a first sun gear as the first rotation element, a first planet carrier as the second rotation element, and a first ring gear as the third rotation element, the second planetary gear set may include a second sun gear as the fourth rotation element, a second planet carrier as the fifth rotation element, and a second ring gear as the sixth rotation element, the third planetary gear set may include a third sun gear as the seventh rotation element, a third planet carrier as the eighth rotation element, and a third ring gear as the ninth rotation element, and the fourth planetary gear set may include a fourth sun gear as the tenth rotation element, a fourth planet carrier as the eleventh rotation element, and a fourth ring gear as the twelfth rotation element.

The seventh shaft may be gear-meshed with the fifth shaft and selectively connectable with the transmission housing, and the ninth shaft may be gear-meshed with the sixth shaft.

The transfer gears may include a first transfer gear disposed between the sixth shaft and the ninth shaft, and a second transfer gear disposed between the fifth shaft and the seventh shaft.

The planetary gear train may further include a first clutch disposed between the first shaft and the input shaft, a second clutch disposed between the sixth shaft and the input shaft, a third clutch disposed between the third shaft and the input shaft, a first brake disposed between the first shaft and the transmission housing, a second brake disposed between the fourth shaft and the transmission housing, and a third brake disposed between the seventh shaft and the transmission housing.

The seventh shaft may be gear-meshed with the sixth shaft, and the ninth shaft may be gear-meshed with the fifth shaft and selectively connectable with the transmission housing.

The transfer gears may include a first transfer gear disposed between the sixth shaft and the seventh shaft, and a second transfer gear disposed between the fifth shaft and the ninth shaft.

The planetary gear train may further include a first clutch disposed between the first shaft and the input shaft, a second clutch disposed between the sixth shaft and the input shaft, a third clutch disposed between the third shaft and the input shaft, a first brake disposed between the first shaft and the transmission housing, a second brake disposed between the fourth shaft and the transmission housing, and a third brake disposed between the fifth shaft and the transmission housing.

According to various aspects of the present invention, a planetary gear train of an automatic transmission for a vehicle may include a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, an input shaft mounted with the first, second, and third planetary gear sets at an external circumference of the input shaft, and an output shaft disposed in parallel with the input shaft and mounted with the fourth planetary gear set on an external circumference of the output shaft, in which the first rotation element may be selectively connectable with at least one of the input shaft and a transmission housing, the second, fifth, and ninth rotation elements may be directly connected to each other, the third and fourth rotation elements may be directly connected to each other and selectively connectable with the input shaft, the sixth rotation element may be selectively connectable with the transmission housing, the seventh rotation element may be gear-meshed with one rotation element among the tenth and twelfth rotation elements, and selectively acts as a fixed element, the eighth rotation element may be gear-meshed with a remaining rotation element among the tenth and twelfth rotation elements, and selectively connectable with the input shaft, and the eleventh rotation element may be directly connected with the output shaft.

The seventh rotation element may be gear-meshed with the tenth rotation element through a second transfer gear, and the eighth rotation element may be gear-meshed with the twelfth rotation element through a first transfer gear.

The planetary gear train may further include a first clutch selectively connecting the first rotation element and the input shaft, a second clutch selectively connecting the eighth rotation element and the input shaft, a third clutch selectively connecting the third rotation element and the input shaft, a first brake selectively connecting the first rotation element with the transmission housing, a second brake selectively connecting the sixth rotation element with the transmission housing, and a third brake selectively connecting the seventh rotation element with the transmission housing.

The planetary gear train may further include a first clutch selectively connecting the first rotation element and the input shaft, a second clutch selectively connecting the eighth rotation element and the input shaft, a third clutch selectively connecting the third rotation element and the input shaft, a first brake selectively connecting the first rotation element with the transmission housing, a second brake selectively connecting the sixth rotation element with the transmission housing, and a third brake selectively connecting the tenth rotation element with the transmission housing.

The seventh rotation element may be gear-meshed with the twelfth rotation element through to second transfer gear, and the eighth rotation element may be externally gear-meshed with the tenth rotation element through a first transfer gear.

According to a planetary gear train of various embodiments of the present invention, planetary gear sets are dividedly arranged on input and output shafts disposed in parallel, thereby reducing a length and improving installability.

According to a planetary gear train of various embodiments of the present invention, at least eight forward speeds and at least one reverse speed may be realized by employing two transfer gears in addition to a combination of planetary gear sets, thereby providing a wide range of varying gear teeth so as to easily achieve optimum gear ratio and to easily comply with required performance for respective vehicles.

In addition, according to a planetary gear train of various embodiments of the present invention, a gear ratio span of more than 11.0 may be achieved while realizing at least nine forward speeds and at least one reverse speed, thereby maximizing an engine driving efficiency.

Furthermore, the linearity of step ratios of shift stages is secured while multi-staging the shift stages with high efficiency, thereby making it possible to improve drivability such as acceleration before and after a shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
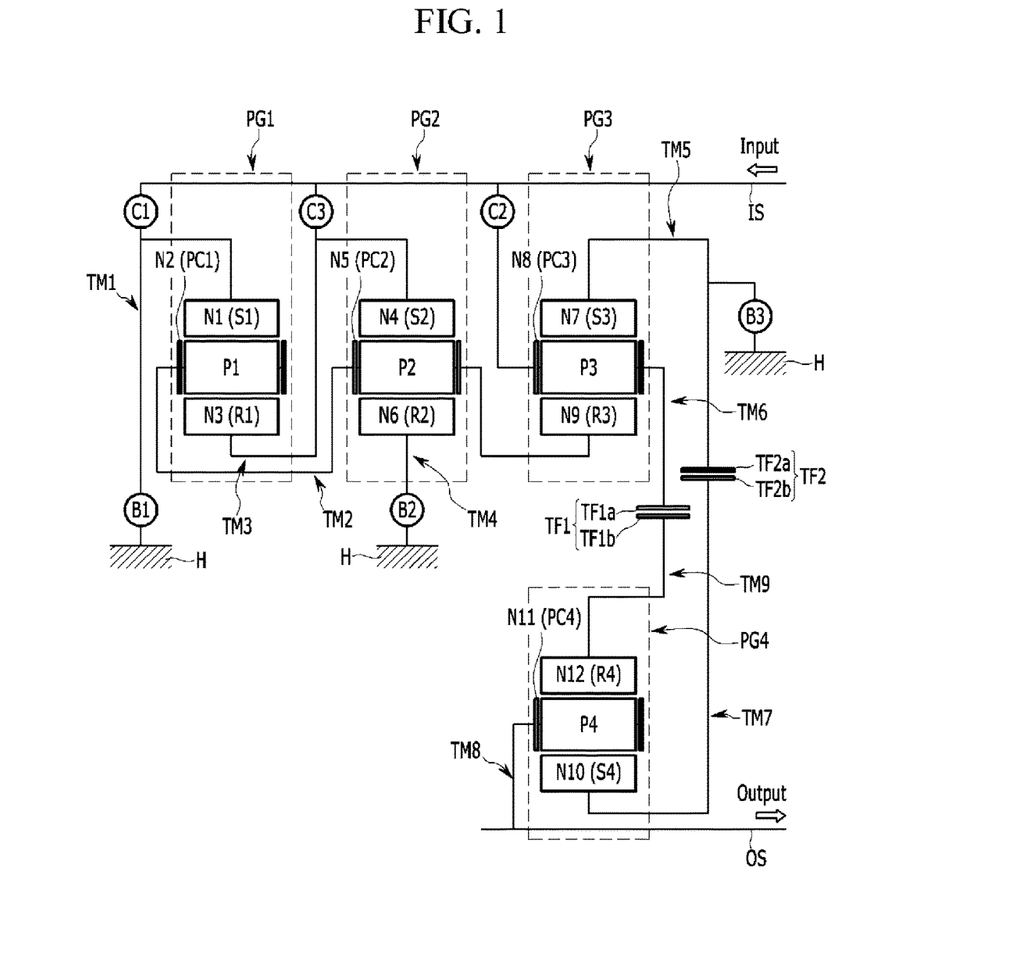
FIG. 1 is a schematic diagram of a planetary gear train according to various embodiments of the present invention.

FIG. 1 is a schematic diagram of a planetary gear train according to a first exemplary embodiment of the present invention.

Referring to FIG. 1, a planetary gear train according to a first exemplary embodiment of the present invention includes an input shaft IS, an output shaft OS, first, second, third, and fourth planetary gear sets PG1, PG2, PG3, and PG4, two transfer gears TF1 and TF2 and control elements of three clutches C1, C2, and C3 and three brakes B1, B2, and B3.

The input shaft IS is an input member and the torque from a crankshaft of an engine is input into the input shaft IS, after being torque-converted through a torque converter.

The output shaft OS is an output member, and, arranged in parallel with the input shaft IS, outputs a shifted driving torque to a drive shaft through a differential apparatus.

The first, second, and third planetary gear sets PG1, PG2, and PG3 are sequentially arranged on an external circumference of the input shaft IS and form a main shifting portion. The fourth planetary gear set PG4 is arranged at external circumference of the output shaft OS disposed in parallel with the input shaft IS and forms an auxiliary shifting portion.

The first planetary gear set PG1 is a single pinion planetary gear set, and includes a first sun gear S1, a first planet carrier PC1 that supports first pinion P1 externally engaged with the first sun gear S1, and a first ring gear R1 that is internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports second pinion P2 externally engaged with the second sun gear S2, and a second ring gear R2 that is internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports third pinion P3 externally engaged with the third sun gear S3, and a third ring gear R3 that is internally engaged with the third pinion P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports fourth pinion P4 externally engaged with the fourth sun gear S4, and a fourth ring gear R4 that is internally engaged with the fourth pinion P4. The fourth sun gear S4 acts as a tenth rotation element N10, the fourth planet carrier PC4 acts as a eleventh rotation element N11, and the fourth ring gear R4 acts as a twelfth rotation element N12.

In the arrangement of the first, second, and third planetary gear sets PG1, PG2, and PG3, the second rotation element N2 is directly connected with the fifth rotation element N5 and the ninth rotation element N9, the third rotation element N3 is directly connected with the fourth rotation element N4, by six shafts TM1 to TM6.

Three shafts TM7 to TM9 are connected to the fourth planetary gear set PG4.

The nine shafts TM1 to TM9 are hereinafter described in detail.

The first shaft TM1 is connected with the first rotation element N1 (first sun gear S1), and selectively connectable with the input shaft IS or the transmission housing H thereby selectively acting as an input element or a fixed element.

The second shaft TM2 interconnects the second rotation element N2 (first planet carrier PC1) and fifth rotation element N5 (second planet carrier PC2) and the ninth rotation element N9 (third ring gear R3).

The third shaft TM3 interconnects the third rotation element N3 (first ring gear R1) and the fourth rotation element N4 (second sun gear S2), and selectively connectable with the input shaft IS, thereby selectively acting as an input element.

The fourth shaft TM4 is connected with the sixth rotation element N6 (second ring gear R2), and selectively connectable with the transmission housing H, thereby selectively acting as a fixed element.

The fifth shaft TM5 is connected with seventh rotation element N7 (third sun gear S3).

The sixth shaft TM6 is connected with the eighth rotation element N8 (third planet carrier PC3), and selectively connectable with the input shaft IS, thereby selectively acting as an input element.

The seventh shaft TM7 is connected with the tenth rotation element N10 (fourth sun gear S4), and externally gear-meshed with the fifth shaft TM5.

The eighth shaft TM8 is connected with the eleventh rotation element N11 (fourth planet carrier PC4), and directly connected with the output shaft OS, thereby continuously acting as an output element.

The ninth shaft TM9 is connected with the twelfth rotation element N12 (fourth ring gear R4), and externally gear-meshed with the sixth shaft TM6.

The two transfer gear TF1 and TF2 delivers a shifted torque of the main shifting portion having the first, second, and third planetary gear sets PG1, PG2, and PG3 to the auxiliary shifting portion having the fourth planetary gear set PG4, in a reverse rotation.

The first transfer gear TF1 includes a first transfer gear TF1*a* directly connected with the sixth shaft TM6 and a first transfer gear TF1*b* directly connected with the ninth shaft TM9, and externally gear-meshes the sixth shaft TM6 and the ninth shaft TM9.

The second transfer gear TF2 includes a second transfer gear TF2*a* directly connected with the fifth shaft TM5 and a second transfer gear TF2*b* directly connected with the seventh shaft TM7, and externally gear-meshes the fifth shaft TM5 and the seventh shaft TM7.

As a result, respective shafts connected by the first and second transfer gears TF1 and TF2 rotate in opposite directions, and the gear ratios of the first and second transfer gears TF1 and TF2 may be preset in consideration of required speed ratio of the transmission.

Control elements of three clutches C1, C2, and C3 are arranged between the input shaft IS and three shafts respectively, control elements of three brakes B1, B2, and B3 are arranged between the transmission housing H and three shafts.

The three clutches C1, C2, and C3 and the three brakes B1, B2, and B3 are arranged as follows.

The first clutch C1 is arranged between the input shaft IS and the first shaft TM1, such that the input shaft IS and the first shaft TM1 may selectively become integral.

The second clutch C2 is arranged between the input shaft IS and the third shaft TM3, such that the input shaft IS and the third shaft TM3 may selectively become integral.

The third clutch C3 is arranged between the input shaft IS and the sixth shaft TM6, such that the input shaft IS and the sixth shaft TM6 may selectively become integral.

The first brake B1 is arranged between the first shaft TM1 and the transmission housing H, such that the first shaft TM1 may selectively act as a fixed element.

The second brake B2 is arranged between the fourth shaft TM4 and the transmission housing H, such that the fourth shaft TM4 may selectively act as a fixed element.

The third brake B3 is arranged between the fifth shaft TM5 and the transmission housing H, such that the fifth shaft TM5 may selectively act as a fixed element.

The control elements of first, second, and third clutches C1, C2, and C3 and first, second, third brakes B1, B2, and B3 may be realized as multi-plate hydraulic pressure friction devices that are frictionally engaged by hydraulic pressure.

Figure 2:
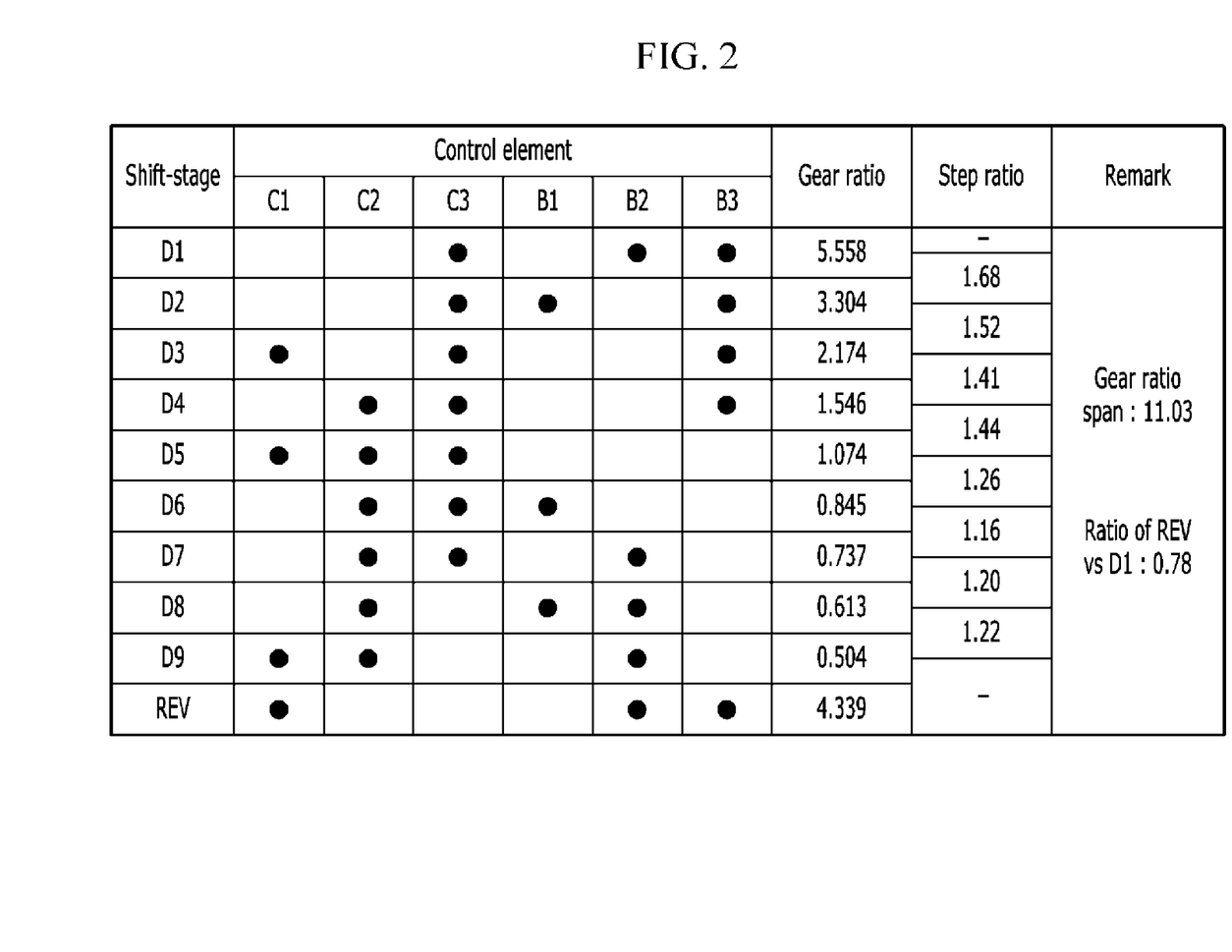
FIG. 2 is an operational chart for respective control elements at respective shift-stages in a planetary gear train according to various embodiments of the present invention.

FIG. 2 is an operational chart for respective control elements at respective shift-stages in a planetary gear train according to a first exemplary embodiment of the present invention.

Referring to FIG. 2, a planetary gear train according to an exemplary embodiment of the present invention realizes shifting by operating three control elements among the three clutches C1, C2, and C3 and the three brakes B1, B2, and B3.

[The Forward First Speed]

In the forward first speed shift-stage D1, the third clutch C3 and the second and third brakes B2 and B3 are operated.

As a result, the third shaft TM3 is connected with the input shaft IS by the operation of the third clutch C3. In this state, the torque of the input shaft IS is input to the third shaft TM3, and the fourth shaft TM4 and the fifth shaft TM5 act as fixed elements by the operation of the second brake B2 and the third brake B3, thereby realizing the forward first speed by cooperative operation of respective shafts and outputting a shifted torque to the output shaft OS connected with the eighth shaft TM8.

[The Forward Second Speed]

In the forward second speed shift-stage D2, the third clutch C3 and the first and third brakes B1 and B3 are operated.

As a result, the third shaft TM3 is connected with the input shaft IS by the operation of the third clutch C3. In this state, the torque of the input shaft IS is input to the third shaft TM3, and the first shaft TM1 and the fifth shaft TM5 act as fixed elements by the operation of the first brake B1 and the third brake B3, thereby realizing the forward second speed by cooperative operation of respective shafts and outputting a shifted torque to the output shaft OS connected with the eighth shaft TM8.

[The Forward Third Speed]

In the forward third speed shift-stage D3, the first and third clutches C1 and C3 and the third brake B3 are operated.

As a result, the first shaft C1 is connected with the input shaft IS by the operation of the first clutch C1, and the third shaft TM3 is connected with the input shaft IS by the operation of the third clutch C3. In this state, the torque of the input shaft IS is input to the first, third shaft TM1 and TM3, and the fifth shaft TM5 acts as a fixed element by the operation of the third brake B3, thereby realizing the forward third speed by cooperative operation of respective shafts and outputting a shifted torque to the output shaft OS connected with the eighth shaft TM8.

[The Forward Fourth Speed]

In the forward fourth speed shift-stage D4, the second and third clutches C2 and C3 and the third brake B3 are operated.

As a result, the sixth shaft TM6 is connected with the input shaft IS by the operation of the second clutch C2, and the third shaft TM3 is connected with the input shaft IS by the operation of the third clutch C3. In this state, the torque of the input shaft IS is input to the third, sixth shaft TM3 and TM6, and the fifth shaft TM5 acts as a fixed element by the operation of the third brake B3, thereby realizing the forward fourth speed by cooperative operation of respective shafts and outputting a shifted torque to the output shaft OS connected with the eighth shaft TM8.

[The Forward Fifth Speed]

In the forward fifth speed shift-stage D5, the first, second, and third clutches C1, C2, and C3 are operated.

As a result, the first shaft TM1 is connected with the input shaft IS by the operation of the first clutch C1, the sixth shaft TM6 is connected with the input shaft IS by the operation of the second clutch C2, and the third shaft TM3 is connected with the input shaft IS by the operation of the third clutch C3. In this state, the torque of the input shaft IS is input to the first, sixth, and third shafts TM1, TM6, and TM3, thereby realizing the forward fifth speed by cooperative operation of respective shafts and outputting a shifted torque to the output shaft OS connected with the eighth shaft TM8.

[The Forward Sixth Speed]

In the forward sixth speed shift-stage D6, the second and third clutches C2 and C3 and the first brake B1 are operated.

As a result, the sixth shaft TM6 is connected with the input shaft IS by the operation of the second clutch C2, and the third shaft TM3 is connected with the input shaft IS by the operation of the third clutch C3. In this state, the torque of the input shaft IS is input to the third, sixth shaft TM3 and TM6, and the first shaft TM1 acts as a fixed element by the operation of the first brake B1, thereby realizing the forward sixth speed by cooperative operation of respective shafts and outputting a shifted torque to the output shaft OS connected with the eighth shaft TM8.

[The Forward Seventh Speed]

In the forward seventh speed shift-stage D7, the second and third clutches C2 and C3 and the second brake B2 are operated.

As a result, the sixth shaft TM6 is connected with the input shaft IS by the operation of the second clutch C2, and the third shaft TM3 is connected with the input shaft IS by the operation of the third clutch C3. In this state, the torque of the input shaft IS is input to the third, sixth shaft TM3 and TM6, and the fourth shaft TM4 acts as a fixed element by the operation of the second brake B2, thereby realizing the forward seventh speed by cooperative operation of respective shafts and outputting a shifted torque to the output shaft OS connected with the eighth shaft TM8.

[The Forward Eighth Speed]

In the forward eighth speed shift-stage D8, the second clutch C2 and the first and second brakes B1 and B2 are operated.

As a result, the sixth shaft TM6 is connected with the input shaft IS by the operation of the second clutch C2. In this state, the torque of the input shaft IS is input to the sixth shaft TM6, and the first shaft TM1 and the fourth shaft TM4 act as fixed elements by the operation of the first brake B1 and the second brake B2, thereby realizing the forward eighth speed by cooperative operation of respective shafts and outputting a shifted torque to the output shaft OS connected with the eighth shaft TM8.

[The Forward Ninth Speed]

In the forward ninth speed shift-stage D9, the first and second clutch C1 and C2 and the second brake B2 are operated.

As a result, the first shaft TM1 is connected with the input shaft IS by the operation of the first clutch C1, and the sixth shaft TM6 is connected with the input shaft IS by the operation of the second clutch C2. In this state, the torque of the input shaft IS is input to the first, sixth shaft TM1 and TM6, and the fourth shaft TM4 acts as a fixed element by the operation of the second brake B2, thereby realizing the forward ninth speed by cooperative operation of respective shafts and outputting a shifted torque to the output shaft OS connected with the eighth shaft TM8.

[The Reverse Speed]

In the reverse speed, the first clutch C1 and the second and third brakes B2 and B3 are operated.

As a result, the first shaft TM1 is connected with the input shaft IS by the operation of the first clutch C1. In this state, the torque of the input shaft IS is input to the first shaft TM1, and the fourth shaft TM4 and the fifth shaft TM5 act as fixed elements by the operation of the second brake B2 and the third brake B3, thereby realizing the reverse speed by cooperative operation of the shafts and outputting a shifted torque to the output shaft OS connected with the eighth shaft TM8.

FIG. 2 shows gear ratios calculated under the condition that the gear ratio of the first ring gear R1/the first sun gear S1 is 1.92, the gear ratio of the second ring gear R2/the second sun gear S2 is 1.56, the gear ratio of the third ring gear R3/the third sun gear S3 is 2.46, the gear ratio of the fourth ring gear R4/the fourth sun gear S4 is 1.83, the gear ratio of the first transfer driven gear TF1b/the first transfer drive gear TF1a is 1.00, and the gear ratio of the second transfer driven gear TF2b/the second transfer drive gear TF2a is 1.24.

Figure 3:
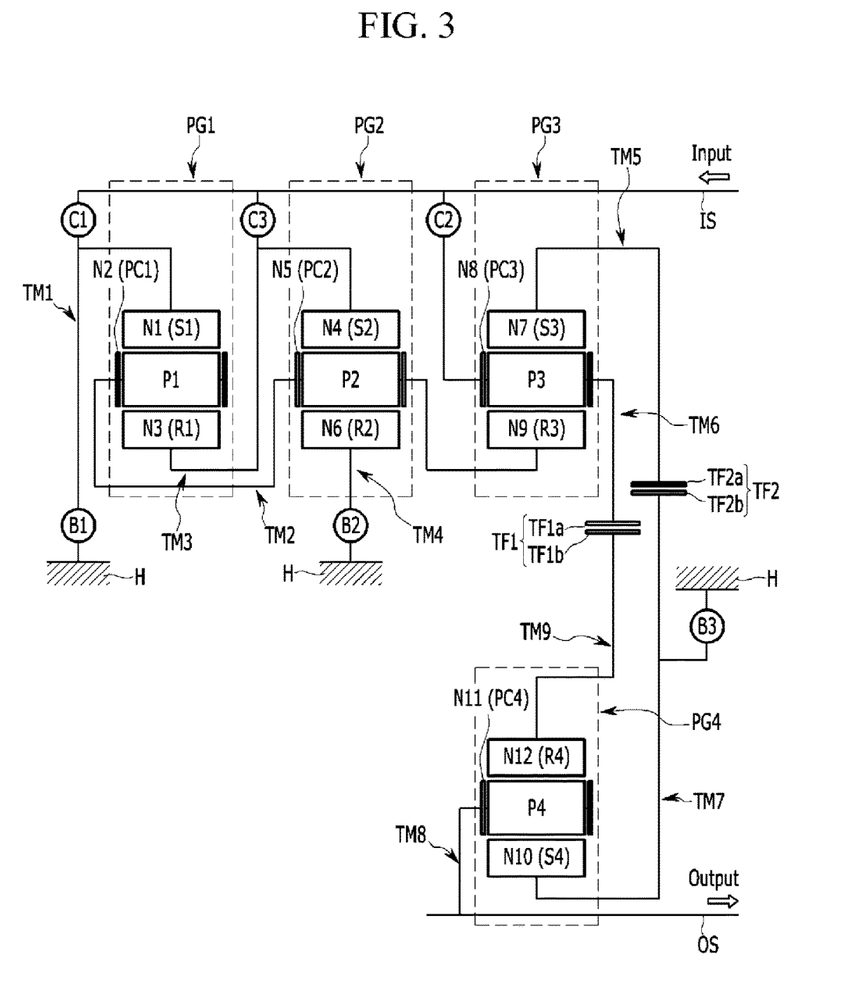
FIG. 3 is a schematic diagram of a planetary gear train according to various embodiments of the present invention.

FIG. 3 is a schematic diagram of a planetary gear train according to a second exemplary embodiment of the present invention.

In a planetary gear train according to a first exemplary embodiment of the present invention, the third brake B3 is arranged between the fifth shaft TM5 and the transmission housing H, as shown in FIG. 1. However, referring to FIG. 3, the third brake B3 is arranged between the seventh shaft TM7 and the transmission housing H, according to a planetary gear train according to a second exemplary embodiment.

As a result, while the fifth shaft TM5 acts as a fixed element by the operation of the third brake B3, and the seventh shaft TM7 externally gear-meshed with the fifth shaft TM5 simultaneously acts as a fixed element in a planetary gear train according to a first exemplary embodiment, the seventh shaft TM7 acts as a fixed element by the operation of the third brake B3 and the fifth shaft TM5 externally gear-meshed with the seventh shaft TM7 simultaneously acts as a fixed element according to a planetary gear train according to a second exemplary embodiment. This means that a mere location of the third brake B3 differs maintaining a same operation and function, which is therefore not described in further detail.

Figure 4:
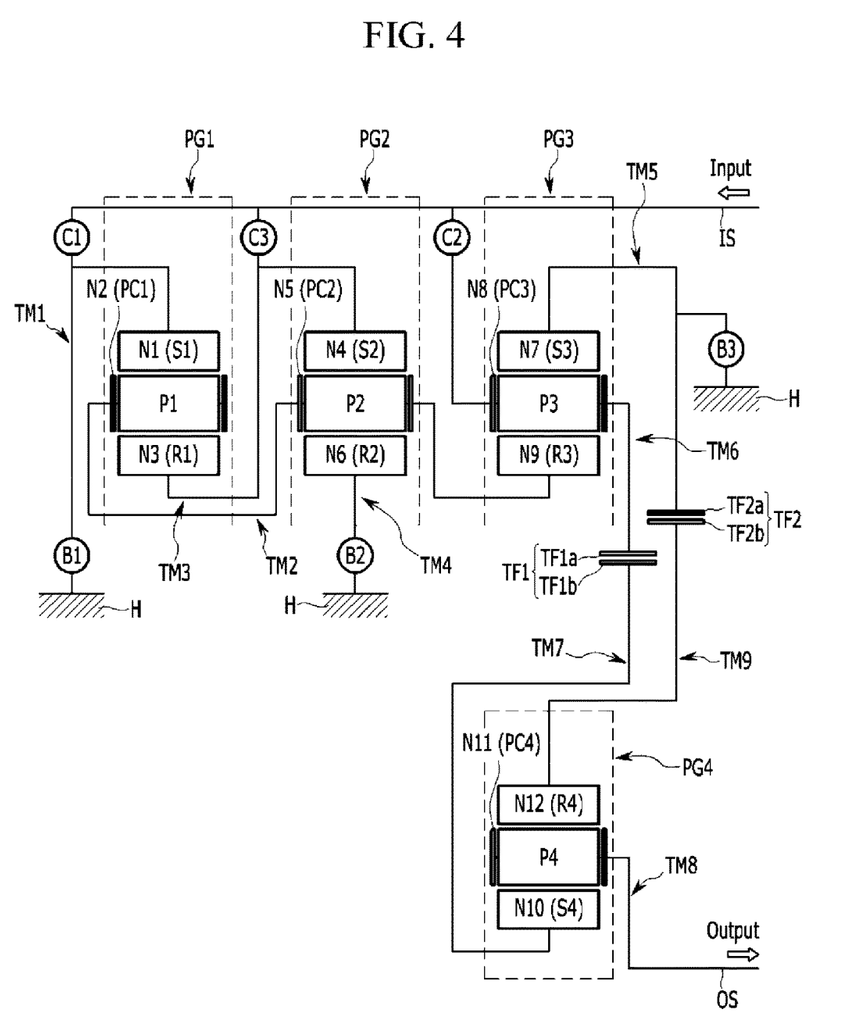
FIG. 4 is a schematic diagram of a planetary gear train according to various embodiments of the present invention.

FIG. 4 is a schematic diagram of a planetary gear train according to a third exemplary embodiment of the present invention.

In a planetary gear train according to a first exemplary embodiment of the present invention, the sixth shaft TM6 is externally gear-meshed with the ninth shaft TM9 through the first transfer gear TF1, and the fifth shaft TM5 is externally gear-meshed with the seventh shaft TM7 through the second transfer gear TF2, as shown in FIG. 1.

However, referring to FIG. 4, the sixth shaft TM6 is externally gear-meshed with the seventh shaft TM7 through the first transfer gear TF1, and the fifth shaft TM5 is externally gear-meshed with the ninth shaft TM9 through the second transfer gear TF2, according to the third exemplary embodiment.

As a result, the third exemplary embodiment differs from the first exemplary embodiment in that rotation speed outputted through the sixth shaft TM6 and the fifth shaft TM5 thereby altering speed ratios of the auxiliary shifting portion. However, it will be easily understood that the planetary gear train maintains a same operation and function, which is therefore not described in further detail.

As described above, according to a planetary gear train of various embodiments of the present invention, at least nine forward speeds and at least one reverse speed are realized by a combination of four planetary gear sets, two transfer gears, and six control elements, thereby providing improvement of power delivery performance and fuel consumption and improving installability by shortening the length of an automatic transmission.

In addition, according to a planetary gear train of various embodiments of the present invention, two transfer gears of external gears arranged on the output shaft OS are employed in addition to three planetary gear sets, and thus, gear teeth may be widely varied so as to easily achieve optimum gear ratio and to easily comply with required performance for respective vehicles.

Furthermore, according to a planetary gear train of various embodiments of the present invention, a gear ratio span of more than 11.0 are achieved while realizing at least nine forward speeds and at least one reverse speed, thereby maximizing an engine driving efficiency.

Additionally, the linearity of step ratios of shift stages is secured while multi-staging the shift stage with high efficiency, thereby making it possible to improve drivability such as acceleration before and after a shift, an engine speed rhythmic sense, and the like.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
an input shaft mounted with the first, second, and third planetary gear sets at an external circumference of the input shaft;
an output shaft disposed in parallel with the input shaft and mounted with the fourth planetary gear set on an external circumference of the output shaft;
a first shaft connected with the first rotation element;
a second shaft connecting the second rotation element, the fifth rotation element, and the ninth rotation element;
a third shaft interconnecting the third rotation element and the fourth rotation element;
a fourth shaft connected with the sixth rotation element;
a fifth shaft connected with the seventh rotation element;
a sixth shaft connected with the eighth rotation element;
a seventh shaft connected with the tenth rotation element, and gear-meshed with one shaft among the fifth and sixth shafts;
an eighth shaft connected with the eleventh rotation element and directly connected with the output shaft;
a ninth shaft connected with the twelfth rotation element, and gear-meshed with a remaining shaft among the fifth and sixth shafts that is not gear-meshed with the seventh shaft; and
transfer gears, each gear-meshed with at least one of the first, second, third, fourth, fifth, sixth, seventh, eighth, and ninth shafts.

2. The planetary gear train of claim 1, wherein
the first shaft is selectively connectable with at least one of the input shaft and a transmission housing;
the third shaft is selectively connectable with the input shaft;
the fourth shaft is selectively connectable with the transmission housing; and
the sixth shaft is selectively connectable with the input shaft.

3. The planetary gear train of claim 1, wherein
the first planetary gear set includes a first sun gear as the first rotation element, a first planet carrier as the second rotation element, and a first ring gear as the third rotation element;
the second planetary gear set includes a second sun gear as the fourth rotation element, a second planet carrier as the fifth rotation element, and a second ring gear as the sixth rotation element;
the third planetary gear set includes a third sun gear as the seventh rotation element, a third planet carrier as the eighth rotation element, and a third ring gear as the ninth rotation element; and
the fourth planetary gear set includes a fourth sun gear as the tenth rotation element, a fourth planet carrier as the eleventh rotation element, and a fourth ring gear as the twelfth rotation element.

4. The planetary gear train of claim 2, wherein
the seventh shaft is gear-meshed with the fifth shaft and selectively connectable with the transmission housing; and
the ninth shaft is gear-meshed with the sixth shaft.

5. The planetary gear train of claim 4, wherein the transfer gears comprise:
a first transfer gear disposed between the sixth shaft and the ninth shaft; and
a second transfer gear disposed between the fifth shaft and the seventh shaft.

6. The planetary gear train of claim 4, further comprising:
a first clutch disposed between the first shaft and the input shaft;
a second clutch disposed between the sixth shaft and the input shaft;
a third clutch disposed between the third shaft and the input shaft;
a first brake disposed between the first shaft and the transmission housing;
a second brake disposed between the fourth shaft and the transmission housing; and
a third brake disposed between the fifth shaft and the transmission housing.

7. The planetary gear train of claim 4, further comprising:
a first clutch disposed between the first shaft and the input shaft;
a second clutch disposed between the sixth shaft and the input shaft;
a third clutch disposed between the third shaft and the input shaft;
a first brake disposed between the first shaft and the transmission housing;
a second brake disposed between the fourth shaft and the transmission housing; and
a third brake disposed between the seventh shaft and the transmission housing.

8. The planetary gear train of claim 2, wherein
the seventh shaft is gear-meshed with the sixth shaft; and
the ninth shaft is gear-meshed with the fifth shaft and selectively connectable with the transmission housing.

9. The planetary gear train of claim 8, wherein the transfer gears comprise:
a first transfer gear disposed between the sixth shaft and the seventh shaft; and
a second transfer gear disposed between the fifth shaft and the ninth shaft.

10. The planetary gear train of claim 8, further comprising:
a first clutch disposed between the first shaft and the input shaft;
a second clutch disposed between the sixth shaft and the input shaft;
a third clutch disposed between the third shaft and the input shaft;

a first brake disposed between the first shaft and the transmission housing;
a second brake disposed between the fourth shaft and the transmission housing; and
a third brake disposed between the fifth shaft and the transmission housing.

11. A planetary gear train of an automatic transmission for a vehicle, comprising:
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
an input shaft mounted with the first, second, and third planetary gear sets at an external circumference of the input shaft; and
an output shaft disposed in parallel with the input shaft and mounted with the fourth planetary gear set on an external circumference of the output shaft,
wherein the first rotation element is selectively connectable with at least one of the input shaft and a transmission housing,
the second, fifth, and ninth rotation elements are directly connected to each other,
the third and fourth rotation elements are directly connected to each other and selectively connectable with the input shaft,
the sixth rotation element is selectively connectable with the transmission housing,
the seventh rotation element is gear-meshed with one rotation element among the tenth and twelfth rotation elements, and selectively acts as a fixed element,
the eighth rotation element is gear-meshed with a remaining rotation element among the tenth and twelfth rotation elements, and selectively connectable with the input shaft, and
the eleventh rotation element is directly connected with the output shaft.

12. The planetary gear train of claim 11, wherein
the first planetary gear set comprises a first sun gear as the first rotation element, a first planet carrier as the second rotation element, and a first ring gear as the third rotation element;
the second planetary gear set comprises a second sun gear as the fourth rotation element, a second planet carrier as the fifth rotation element, and a second ring gear as the sixth rotation element;
the third planetary gear set comprises a third sun gear as the seventh rotation element, a third planet carrier as the eighth rotation element, and a third ring gear as the ninth rotation element; and
the fourth planetary gear set comprises a fourth sun gear as the tenth rotation element, a fourth planet carrier as the eleventh rotation element, and a fourth ring gear as the twelfth rotation element.

13. The planetary gear train of claim 11, wherein the seventh rotation element is gear-meshed with the tenth rotation element through a second transfer gear, and the eighth rotation element is gear-meshed with the twelfth rotation element through a first transfer gear.

14. The planetary gear train of claim 13, further comprising:
a first clutch selectively connecting the first rotation element and the input shaft;
a second clutch selectively connecting the eighth rotation element and the input shaft;
a third clutch selectively connecting the third rotation element and the input shaft;
a first brake selectively connecting the first rotation element with the transmission housing;
a second brake selectively connecting the sixth rotation element with the transmission housing; and
a third brake selectively connecting the seventh rotation element with the transmission housing.

15. The planetary gear train of claim 13, further comprising:
a first clutch selectively connecting the first rotation element and the input shaft;
a second clutch selectively connecting the eighth rotation element and the input shaft;
a third clutch selectively connecting the third rotation element and the input shaft;
a first brake selectively connecting the first rotation element with the transmission housing;
a second brake selectively connecting the sixth rotation element with the transmission housing; and
a third brake selectively connecting the tenth rotation element with the transmission housing.

16. The planetary gear train of claim 11, wherein the seventh rotation element is gear-meshed with the twelfth rotation element through to second transfer gear, and the eighth rotation element is externally gear-meshed with the tenth rotation element through a first transfer gear.

17. The planetary gear train of claim 16, further comprising:
a first clutch selectively connecting the first rotation element and the input shaft;
a second clutch selectively connecting the eighth rotation element and the input shaft;
a third clutch selectively connecting the third rotation element and the input shaft;
a first brake selectively connecting the first rotation element with the transmission housing;
a second brake selectively connecting the sixth rotation element with the transmission housing; and
a third brake selectively connecting the seventh rotation element with the transmission housing.

* * * * *